United States Patent
Yu et al.

(10) Patent No.: US 8,873,855 B2
(45) Date of Patent: Oct. 28, 2014

(54) APPARATUS AND METHOD FOR EXTRACTING FOREGROUND LAYER IN IMAGE SEQUENCE

(71) Applicant: Electronics and Telecommunications Research Institute, Daejeon (KR)

(72) Inventors: Jung Jae Yu, Seongnam (KR); Ho Wook Jang, Daejeon (KR); Seung Woo Nam, Daejeon (KR); Kyung Ho Jang, Daegu (KR); Hae Dong Kim, Daejeon (KR); Hye-Sun Kim, Daejeon (KR); Yun Ji Ban, Daejeon (KR); Myung Ha Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 92 days.

(21) Appl. No.: 13/791,791

(22) Filed: Mar. 8, 2013

(65) Prior Publication Data
US 2013/0236099 A1 Sep. 12, 2013

(30) Foreign Application Priority Data

Mar. 8, 2012 (KR) .......................... 10-2012-0024077

(51) Int. Cl.
*G06K 9/00* (2006.01)
*G06T 7/00* (2006.01)
*G06T 7/20* (2006.01)

(52) U.S. Cl.
CPC ..... *G06T 7/0097* (2013.01); *G06T 2207/10016* (2013.01); *G06T 7/204* (2013.01); *G06T 2207/20036* (2013.01); *G06T 2207/30196* (2013.01); *G06T 2207/10024* (2013.01)
USPC ........................................................ 382/173

(58) Field of Classification Search
None
See application file for complete search history.

(56) References Cited

U.S. PATENT DOCUMENTS

| 2001/0048753 | A1* | 12/2001 | Lee et al. .................. 382/103 |
| 2002/0085754 | A1* | 7/2002 | Schoepflin et al. ........... 382/173 |
| 2004/0140994 | A1 | 7/2004 | Choi et al. |
| 2007/0098239 | A1* | 5/2007 | Zhou et al. .................. 382/128 |
| 2010/0046605 | A1 | 2/2010 | Yun |
| 2013/0236099 | A1* | 9/2013 | Yu et al. ..................... 382/171 |

FOREIGN PATENT DOCUMENTS

| KR | 10-2009-0064246 A | 6/2009 |
| KR | 10-2010-0091864 A | 8/2010 |

OTHER PUBLICATIONS

Brian L. Price et al., "LIVEcut: Learning-based Interactive Video Segmentation by Evaluation of Multiple Propagated Cues", IEEE 12th International Conference on Computer Vision, Sep. 29, 2009-Oct. 2, 2009, pp. 779-786, Conference Publications, Kyoto, Japan.

* cited by examiner

*Primary Examiner* — Sean Motsinger (57) ABSTRACT

Disclosed are an apparatus and a method for extracting a foreground layer from an image sequence that extract a foreground object layer area in which a depth value is discontinuous with that of a background from an input image sequence. By using the present disclosure, the layer area is automatically tracked in the subsequent frames through user's setting in the start frame in the image sequence in which the depth values of the foreground and the background are discontinuous, thereby extracting the foreground layer area in which the drift phenomenon and the flickering phenomenon are reduced.

12 Claims, 5 Drawing Sheets

APPARATUS AND METHOD FOR EXTRACTING FOREGROUND LAYER IN IMAGE SEQUENCE

CROSS-REFERENCE TO RELATED APPLICATIONS

This application is based on and claims priority from Korean Patent Application No.10-2012-0024077, filed on Mar. 8, 2012, with the Korean Intellectual Property Office, the disclosure of which is incorporated herein in its entirety by reference.

TECHNICAL FIELD

The present disclosure relates to an apparatus and a method for extracting a foreground layer from an image sequence, and more particularly, to an apparatus and a method for extracting a foreground layer from an image sequence that extract a foreground object layer area in which a depth value is discontinuous with that of a background from an input image sequence.

BACKGROUND

A work of extracting a selected foreground area, that is, a person or moving object area from an input real image sequence may be used for various purposes including a synthesis work of computer graphics (CG) and a real image, a 2D-to-3D conversion work of converting a 2D image sequence into a 3D stereoscopic image sequence, controlling a 3D effect for each object in a stereo 3D image, and the like.

As a method of extracting an area or a contour of an object from an image sequence in the related art, 'active contour', 'gradient vector flow', 'graph-cut based image dividing scheme', and the like have been studied, but since all the schemes depend on a luminance gradient or a color distribution in a boundary line area of the object, a flickering problem occurs and when a foreground and a background are similar in terms of color, a drift phenomenon significantly occurs around a boundary line.

In the case when the depth values of the foreground and the background are discontinuous and a photographing camera moves or a foreground object dynamically moves, background color information outside the boundary line is changed and as a result, a boundary line invasion problem, in other words, drift phenomenon occurs during tracking process. phenomenon of divided areas occurs while interframe tracking is performed.

Meanwhile, an automatic layer extraction function is provided even by commercial tools such as 'After Effect', 'Mocha' and the like which are used in a video content production industry, but a quality at a level utilizable in a company that produces a content for a movie theater is not provided, and thus associated companies still depend on a worker's manual labor.

Therefore, a method capable of suppressing a flickering phenomenon or a drift phenomenon and effectively extracting a foreground layer is required.

SUMMARY

The present disclosure has been made in an effort to provide an apparatus and a method for extracting a foreground layer through user's initial setting with less drift phenomenon and flickering phenomenon on a foreground layer contour from an input image sequence in which depth values of a foreground and a background are discontinuous.

An exemplary embodiment of the present disclosure provides an apparatus of extracting a foreground layer from an image sequence, including: an image sequence receiving unit configured to receive an original image sequence photographed by a camera; an initial area designating unit configured to designate a plurality of control points on the contour of a layer area in image data for each frame through an input device; a layer area tracking unit configured to generate a foreground layer area by connecting the designated control points and track the generated foreground layer for each frame; and an alpha map generating unit configured to generate a curve by connecting control points in all frames in which the layer area is tracked and generate an alpha map by determining an internal area as the layer area.

Another exemplary embodiment of the present disclosure provides a method of extracting a foreground layer from an image sequence, including: receiving, by an image sequence receiving unit, an original image sequence photographed by a camera; designating, by an initial area designating unit, a plurality of control points on a contour of a layer area in image data for each frame by a selection input through an input device; generating, by a layer area tracking unit, a foreground layer area by connecting the designated control points; tracking, by the layer area tracking unit, the generated foreground layer for each frame; connecting, by an alpha map generating unit, respective control point coordinates by a curve generation scheme in all frames in which the layer area is tracked; and generating, by the alpha map generating unit, an alpha map by determining the connected internal area as the layer area.

According to the exemplary embodiments of the present disclosure, when the method of extracting a layer from the image sequence and the apparatus therefor are used, the layer area is automatically tracked in the subsequent frames through user's setting in the start frame in the image sequence in which the depth values of the foreground and the background are discontinuous, thereby extracting the foreground layer area in which the drift phenomenon and the flickering phenomenon are reduced.

As a result, by increasing an automation rate in synthesis of computer graphics (CG) and a real-image, 2D-to-3D stereoscopic conversion, and a layer dividing work required to correct a stereo 3D image, a manufacturing cost and a work time can be remarkably reduced.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
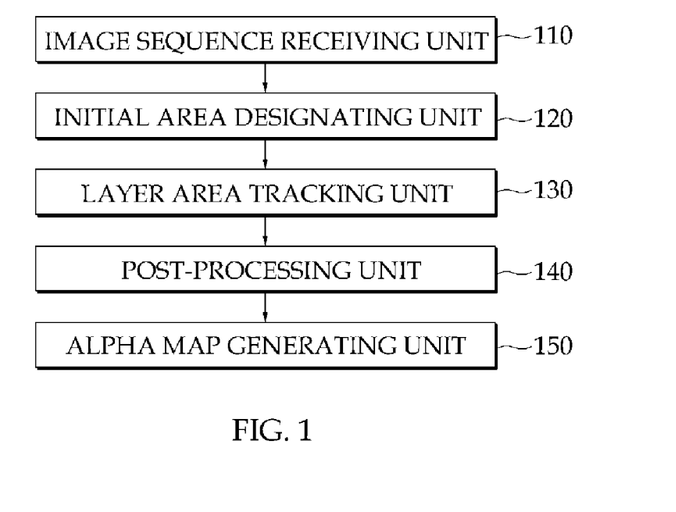
FIG. 1 is a block diagram illustrating an apparatus for extracting a foreground layer from an image sequence according to an exemplary embodiment of the present disclosure.

FIG. 1 is a diagram illustrating an apparatus for extracting a foreground layer from an image sequence according to an exemplary embodiment of the present disclosure. That is, FIG. 1 illustrates an apparatus for extracting a layer from a sequence image according to an exemplary embodiment of the present disclosure.

Referring to FIG. 1, the apparatus for extracting a layer from an image sequence according to the exemplary embodiment of the present disclosure may include an image sequence receiving unit 110, an initial area designating unit 120, a layer area tracking unit 130, a postprocessing unit 140 and an alpha map generating unit 150.

Figure 2:
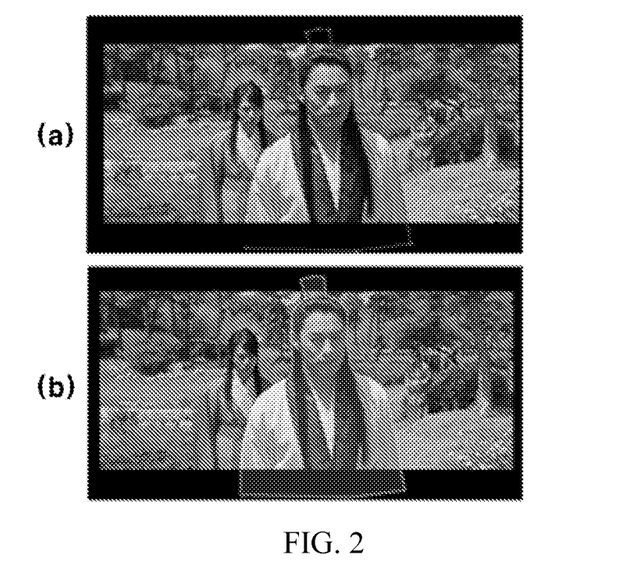
FIG. 2 is a diagram illustrating designation of a control point and generation of an initial layer area according to the exemplary embodiment of the present disclosure.
Figure 3:
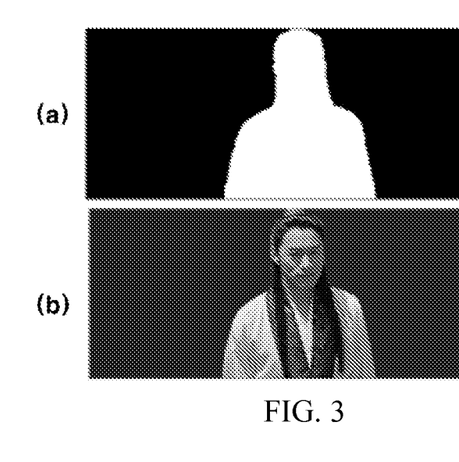
FIG. 3 is a diagram illustrating a result of extracting an alpha map and a layer area according to the exemplary embodiment of the present disclosure.

Meanwhile, a layer area defined by the present disclosure means an object area required to be separated from a background area of an image of which a depth value is discontinuous with that of a background as like a front person area in FIGS. 2 and 3. In this case, the layer is not particularly a single independent object and if necessary, the layer area may be divided according to a subjective reference. For example, when one moving person area is extracted, a whole body may be handled as one layer, but body parts such as an arm, a leg, a body and a head are regarded as respectively divided layers and independently extracted and thereafter, the respective layers are collected to finally acquire a layer including a final whole body in the alpha map generating unit 150.

Meanwhile, since the layer extraction scheme according to the exemplary embodiment of the present disclosure includes a plane tracking processing unit 410 of FIG. 4 to be described below, the object is preferably divided so that an object to be extracted is approximate to a plane, if possible. That is, the object is divided and the respective divided objects are handled as independent layers and pass through the extraction process and thereafter, the results are fused in the alpha map generating unit 150 to acquire a final layer of the independent objects. Therefore, the accuracy of the result may be improved.

First, the image sequence receiving unit 110 receives an original image sequence photographed by a camera and decodes the received image sequence according to the set format to acquire image data for each frame to be used as an input in subsequent steps. In this case, the original image sequence refers to an image sequence in which an image is not processed or deformed through an additional visual effect, may include all of general image sequence file formats such as Mpeg, AVI, MOV and the like, and may include other image sequences used in other specified devices.

Once the original image sequence is input, the image sequence receiving unit 110 analyzes a file format of the image sequence and determines a video/audio codec suitable therefor. The video codec may include H.264, x264, HDX4 and the like and the audio codec may include mp3, wma and the like. It may be appreciated by those skilled in the art to which the present disclosure pertains that they are codecs which are generally used.

In this case, the original image sequence is decoded according to the file format analyzed above. In general, the decoding refers to decompressing and extracting of video data and audio data of each frame, which are compressed by a predetermined method according to the file format. The extracted video data is stored in a memory as an image for each frame and used as the input in the subsequent steps.

In this case, a user designates control points on the contour line of the layer area to be extracted as illustrated in FIG. 2A in a start frame by using a mouse or other input devices to designate an initial area. Data associated with the designated initial area is set and stored through the initial area designating unit 120.

Meanwhile, although the entire single object may be handled as one layer as illustrated in FIG. 2, local parts such as a head, a body, an arm and the like are defined as separate layers if necessary as described above, such that the separate layers may be tracked.

Thereafter, the layer area tracking unit 130 may track a predetermined section in a forward direction or a reverse direction if necessary. In this case, the start frame in the initial area designating unit 120 need not be a first frame on a time axis. As the start frame, a frame including the most foreground layer areas to be extracted is preferably selected, and in some cases, a specific middle frame in the same cut is selected as the start frame, and a prior section and a post section need to be separately tracked in the forward direction or the backward direction.

The control points input by the user may be positioned inside or outside an input image area as illustrated in FIG. 2A, and the control points are all designated and thereafter, and connected by a curve generation method such as 'Bezier', 'Catmull Rom' and the like to generate the foreground layer area in the start frame illustrated in FIG. 2B.

FIG. 3 is a diagram illustrating a result of extracting the alpha map of the current layer and the foreground layer from the start frame generated through the process. In this case, the alpha map indicates a black-and-white image expressing the layer area by mapping the pixels to 255 and the pixels of the background area to 0 as illustrated in FIG. 3A, and FIG. 3B illustrates an example in which only the layer area is extracted and the background is mapped with a blue color by the alpha map.

Figure 4:
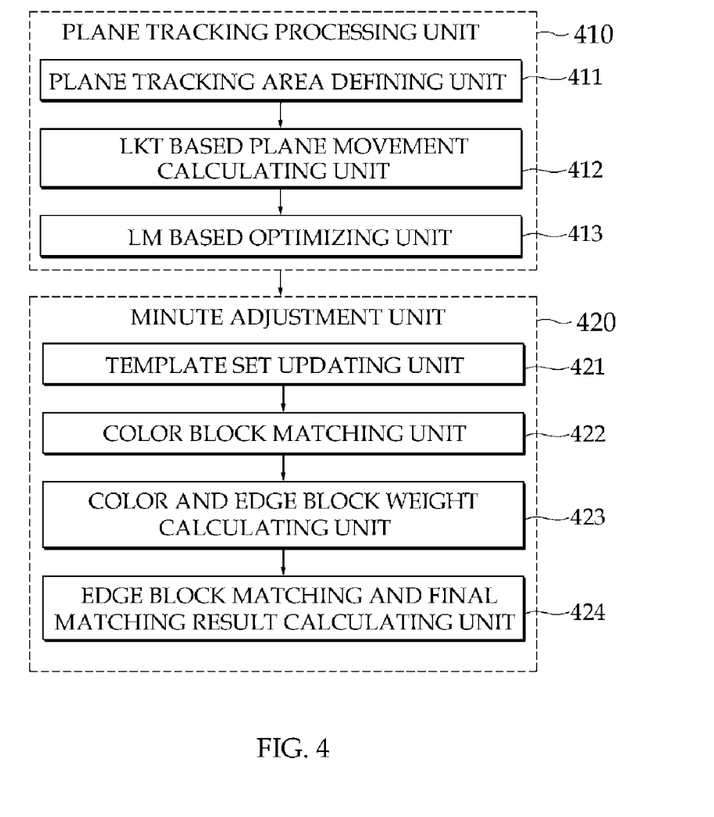
FIG. 4 is a block diagram illustrating a detailed configuration of a layer area tracking unit according to the exemplary embodiment of the present disclosure.

FIG. 4 is a block diagram illustrating a detailed configuration of the layer area tracking unit according to the exemplary embodiment of the present disclosure. Referring to FIG. 4, the layer area tracking unit 130 may include a plane tracking processing unit 410 and a minute adjustment unit 420. The plane tracking processing unit 410 may include a plane tracking area defining unit 411, Loucas Kanade Tomasi(LKT) based plane movement calculating unit 412, Levenberg-Marquardt(LM) based optimizing unit 413 and the like, and the minute adjustment unit 420 may include a template set updating unit 421, a color block matching unit 422, a color and edge block weight calculating unit 423, an edge block matching and final matching result calculating unit 424 and the like.

First, the plane tracking processing unit 410 calculates a 3*3 homography matrix representing a 2D projective transform relationship for each frame on the assumption that the layer area to be tracked is a plane. The plane tracking area defining unit 411 which is a first processing unit of the plane tracking processing unit 410 generates an area in which a range of several pixels is extended so as to include a boundary portion between the layer area and the background by applying morphology dilatation to the layer area designated by the initial area designating unit 120 or the layer area acquired by an operation result in the prior frame, and defines the area as a plane tracking area.

The LKT based plane movement calculating unit 412 which is a second processing unit finds a corresponding relationship of features detected between the prior and post frames in a Loucas Kanade Tracking (LKT) scheme in the defined tracking area. An optimal 3*3 homography matrix that describes the corresponding relationship of the features is calculated through an optimization process based on a Least-Median scheme from the corresponding relationship of the features acquired as above. Since the homography matrix calculated at that time is optimized for only the LKT-detected features, an optimal relationship is not involved for all pixels in the tracking area. When the LKT features are not evenly distributed in the tracking area but concentrated on a predetermined portion and thus asymmetrically distributed, the acquired homography matrix may cause a substantially high error of the entire tracking area.

The LM based optimizing unit 413 which is a third processing unit of the plane tracking processing unit 410 optimizes the homography matrix acquired by the previous processing block (that is, the LKT based plane movement calculating unit 412) to be suitable for color information of all the pixels in the tracking area and calculates a control point coordinate in the current frame by applying the homography matrix to a coordinate in the previous frame with respect to respective control points constituting a contour line of the layer.

In more detail, a Jacobian matrix is calculated on an R, G, B image plane with respect to all the pixels in the tracking area or pixels sampled at a predetermined interval in the tracking area and element values of the homography matrix are adjusted so that an error between the prior and post images described in the homography matrix is minimized by a Levenberg-Marquardt (LM) algorithm. Coordinates of the respective control points in the current frame are calculated according to the calculated homography matrix $H_{LM}$. In <Equation 1> below, $X_{i,t-1}$ denotes a homogeneous coordinate of an i-th control point in the previous frame and $X_{i,t,LM}$ denotes a homogeneous coordinate of the i-th control point calculated by applying the current frame $H_{LM}$.

[Equation 1]
$$X_{i,t-1} = \begin{pmatrix} x_i \\ y_i \\ 1 \end{pmatrix}$$

$$X_i' = H_{LM} X_{i,t-1} = \begin{pmatrix} u_i \\ v_i \\ w_i \end{pmatrix}$$

-continued
$$X_{i,t,LM} = \begin{pmatrix} x_i' \\ y_i' \\ 1 \end{pmatrix} = \begin{pmatrix} \frac{u_i}{w_i} \\ \frac{v_i}{w_i} \\ 1 \end{pmatrix}$$

The minute adjustment unit 420 of FIG. 4 finds more delicate coordinates of the respective control points in the current frame through block matching between R, G and B images and an edge image.

The template set updating unit 421 which is a first processing unit of the minute adjustment unit 420 of FIG. 4 updates a template set to be used at the time of matching blocks for a color and an edge for each control point in all the frames. Herein, the block means a small image extracted in an M*N pixel size around a predetermined image coordinate. A template means a block to be used as a reference for retrieval of an accurate position of the control point and the template set means six types of templates in the R, G, B image, the edge image, a color mask image and an edge mask image. As the template, the corresponding block in the same control point coordinate of the previous frame is generally extracted and used, but a plurality of template sets accumulated from past frames is used in order to reduce a drift phenomenon in which the template is drifted out gradually while tracking is performed.

The minute adjustment unit 420 of FIG. 4 repeatedly performs the operations of the template set updating unit 421, the color block matching unit 422, the color and edge block weight calculating unit 423 and the edge block matching and final matching result calculating unit 424 with respect to the respective control points. Therefore, a method of performing the operation with respect to the i-th control point will be described below for convenience.

The template set updating unit 421 stores template sets of the i-th control point from the previous frame and when the number of the template sets of the i-th control point is more than a predetermined TN, the template set updating unit 421 first removes the oldest template set in sequence. In a storing method, first, a color image of the previous frame is separated into the R, G and B images to store R, G and B image templates. However, since the control points designated by the initial area designating unit 120 are positioned on the contour line of the layer, color information of the background area is also included in the R, G and B image templates in addition to internal color information of the layer.

Figure 5:
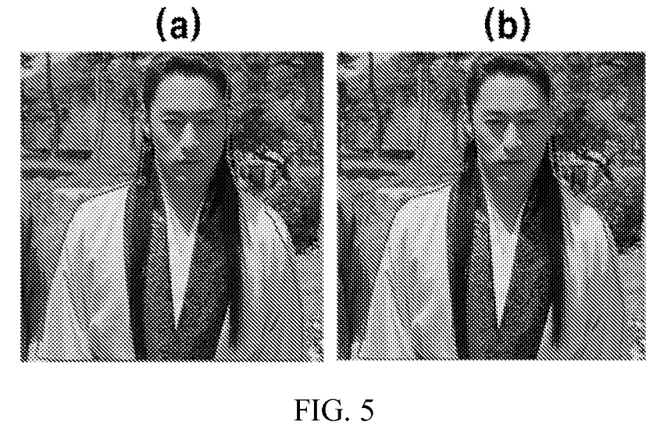
FIG. 5 is a diagram illustrating a method of solving a drift phenomenon of contour line invasion according to the exemplary embodiment of the present disclosure.

Meanwhile, the foreground layer to be extracted in the present disclosure has the depth value is discontinuous with the depth value of the background, which may cause a drift phenomenon in which the pixels of the background area included in a template block invades the contour line of the object when a photographing camera moves or the object of the layer dynamically moves. FIG. 5A illustrates an example in which the drift phenomenon occurs. Referring to FIG. 5A, it can be verified that control points Nos. 11 and 12 are drifted to an edge point of a tree of the background area without following the layer while a person as the layer object walks. In order to solve the problem, a color mask template and an edge mask template are used in the present disclosure. The color mask template extends the alpha map (illustrated FIG. 3A) of the layer acquired from the previous frame by several pixels through the morphology dilatation, and extracts M*N pixel blocks around the i-th control point from the image after Gaussian blur filtering.

Figure 6:
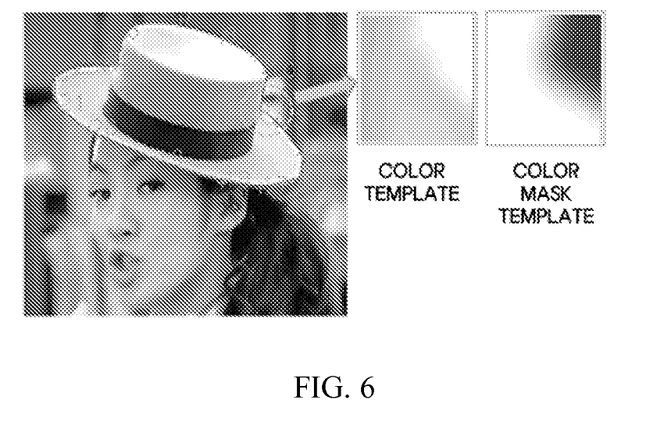
FIG. 6 is a diagram illustrating a color mask template according to the exemplary embodiment of the present disclosure.

FIG. 6 illustrates an example of the color mask template of a 12-th control point of a sample image.

Sometimes, Color information of both the internal area and the external area of the layer around the control point cannot be trusted while tracking is performed. An image which the camera photographs while moving around a target object while facing the target object is a representative case. In this case, when the edge information on the boundary line of the object is used, the drift phenomenon is reduced and the edge template and the edge mask template are stored in order to reduce the drift phenomenon.

Figure 7:
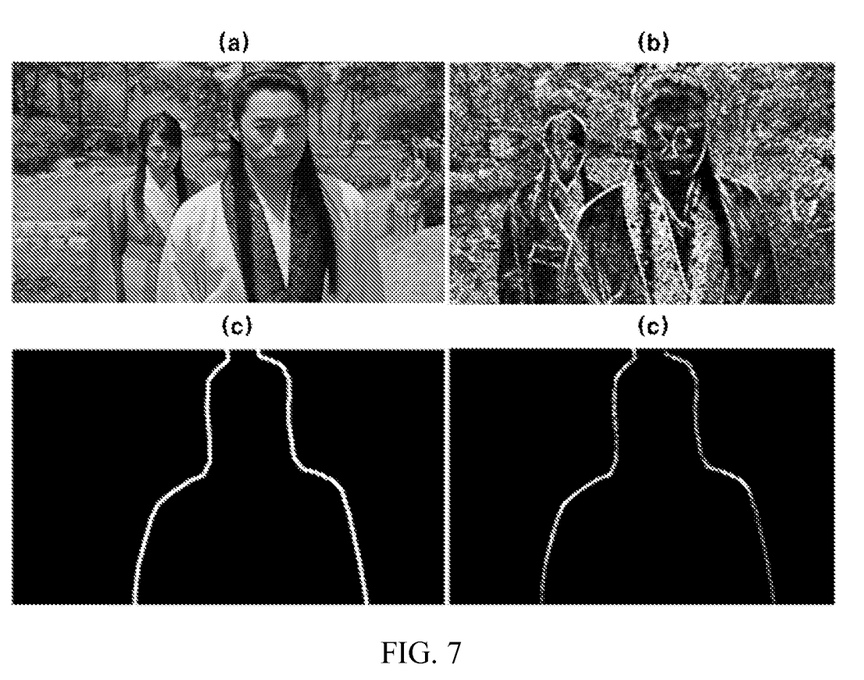
FIG. 7 is a diagram illustrating an edge image and an edge mask image according to the exemplary embodiment of the present disclosure.

FIG. 7A illustrates a color image of the previous frame as an input and FIG. 7B illustrates an edge image acquired by converting a color image into a black-and-white image and thereafter, applying a Sobel operator. FIG. 7C illustrates an edge mask image acquired by extending the layer boundary line area acquired from the previous frame and FIG. 7D illustrates a boundary line edge image acquired by multiplying the edge mask image by the edge image. M*N pixel blocks around the i-th control point coordinate from the boundary line edge image of FIG. 7D are extracted and stored to obtain the edge template. M*N pixel blocks around the i-th control point coordinate from the edge mask image of FIG. 7C are extracted and stored to obtain the edge mask template.

Although the Sobel operator and the morphology operator are used in order to acquire the edge image and the edge mask image in the exemplary embodiment of the present disclosure, the same effect of the disclosure may be acquired even though different methods are used if similar edge and mask results may be acquired.

The color block matching unit 422 retrieves the position of a current frame most similar to the template block in the M*N pixel form in the R, G and B images with respect to the i-th control point. In this case, as a reference to evaluate similarity, a sum of absolute difference (SAD) is used as represented in <Equation 2> and a coordinate in which similarity calculated from the SAD is the maximum in the R, G and B images is retrieved within a predetermined range around $X_{i,t,LM}$ acquired as the result of the plane tracking processing unit.

In <Equation 2> below, $SAD_{R,i}(u, v)$ denotes a SAD value when the i-th control point moves from the result of the plane tracking processing unit 410 by (u, v) in the R image. $TP_{R,i,k}$ denotes the R image template in a k-th template set of the i-th control point and $TP_{CM,i,k}$ denotes the color mask template in the k-th template set of the i-th control point. $N_{TP}$ denotes the number of current template sets of the i-th control point.

$$I_{R,t}\left(x'_i + u + m - \frac{M}{2} + \frac{1}{2}, y'_i + v + n - \frac{N}{2} + \frac{1}{2}\right)$$

denotes a value corresponding to a template set (m, n) when the i-th control point acquired as the result of the plane tracking processing unit 410 moves from a coordinate $(x_i', y_i')$ by (u, v) in the R image of the current frame. By repeatedly performing the process of <Equation 2> above even in the G and B images, $SAD_{G, i (u, v)}$ and $SAD_{B, i (u, v)}$ are calculated.

$$SAD_{R,i}(u,v) = \frac{1}{N_{TP}} \sum_{k=0}^{N_{TP}} \sum_{m=0}^{M-1} \sum_{n=0}^{N-1} TP_{CM,i,k}(m,n) * \quad \text{[Equation 2]}$$

-continued $$\left| TP_{R,i,k}(m, n) - I_{R,t}\begin{pmatrix} x'_i + u + m - \frac{M}{2} + \frac{1}{2}, \\ y'_i + v + n - \frac{N}{2} + \frac{1}{2} \end{pmatrix} \right|$$

Figure 8:
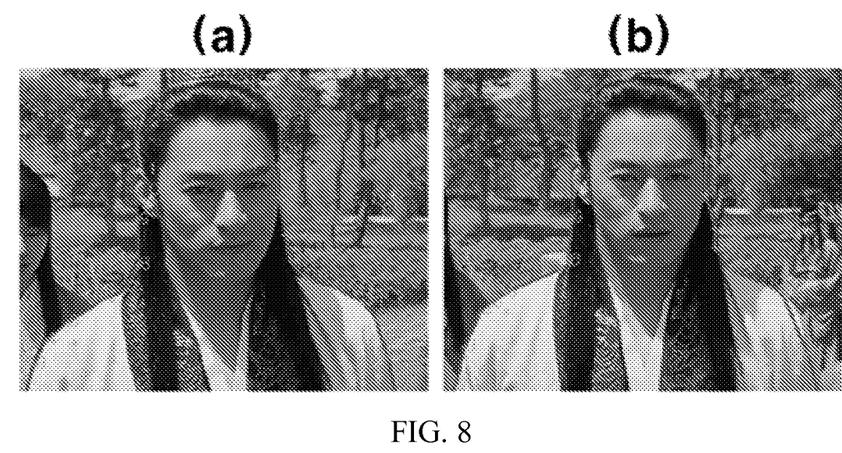
FIG. 8 is a diagram illustrating an example of a drift phenomenon that occurs along a layer contour line.

In this case, if only (u, v) with the minimum SAD is sought, the drift phenomenon in which the control points are drifted along the contour line of the layer occurs. FIG. 8 illustrates an example in which the phenomenon occurs. In FIG. 8A, control points which were positioned at almost even intervals have been crowded into uneven intervals as illustrated in FIG. 8B after tracking for 15 frames minimizing the SAD value in <Equation 2>. (in FIG. 8B, control points Nos. 4, 5 and 6 and control points Nos. 30, 31 and 32 are crowded while moving on the boundary line).

In order to prevent the control points from being crowded, a penalty value depending on variation of a distance ratio between adjacent control points is granted during the block-matching of respective control points. In <Equation 3> below, $d_{i,i-1}$ and $d_{i,i+1}$ denote distances calculated between the i-th control point and adjacent i−1-th and i+1-th control points calculated by the result of the plane tracking processing unit 410.

$K_{EDP,i,u,v}$ denotes a coefficient used for the penalty value depending on the variation of the distance ratio between the adjacent control points when the SAD is calculated at the position moved by (u, v) with respect to the i-th control point from the result coordinate of the plane tracking processing unit 410. $k_{EDP}$ denotes a proportional constant acquired experimentally, which is 0.3 in the exemplary embodiment.

$$d_{i,i-1} = \sqrt{(x'_i - x'_{i-1})^2 + (y'_i - y'_{i-1})^2} \quad \text{[Equation 3]}$$

$$d_{i,i+1} = \sqrt{(x'_i - x'_{i+1})^2 + (y'_i - y'_{i+1})^2}$$

$$r_i = \frac{d_{i,i-1}}{d_{i,i-1} + d_{i,i+1}}$$

$$d_{i,i-1,u,v} = \sqrt{(x'_i + u - x'_{i-1})^2 + (y'_i + v - y'_{i-1})^2}$$

$$d_{i,i+1,u,v} = \sqrt{(x'_i + u - x'_{i+1})^2 + (y'_i + v - y'_{i+1})^2}$$

$$r_{i,u,v} = \frac{d_{i,i-1,u,v}}{d_{i,i-1,u,v} + d_{i,i+1,u,v}}$$

$$rd_{i,u,v} = |r_i - r_{i,u,v}|$$

$$K_{EDP,i,u,v} = 1.0 - k_{EDP} * rd_{i,u,v}$$

$(u', v')_{i,color}$ which is an optimal position for the i-th control point considering the R, G and B image blocks is calculated by <Equation 4> below by using the results of <Equation 2> and <Equation 3> above. In <Equation 4> below, $(u', v')_{i,color}$ denotes the proportional constant, which is 5.0 in the exemplary embodiment.

$$SAD_i(u, v) = \quad \text{[Equation 4]}$$

$$\frac{1}{3} * (SAD_{R,i}(u, v) + SAD_{G,i}(u, v) + SAD_{B,i}(u, v))$$

$$Sim_{i,u,v} = K_{EDP,i,u,v} * (1.0 - k_{SAD} * SAD_i(u, v)/255)$$

$$(u', v')_{i,color} = \underset{(u,v)}{\operatorname{argmax}}(Sim_{i,u,v})$$

The exemplary embodiment describes the example in which the similarity between the blocks are acquired based on the SAD and the penalty value depending on the variation of the distance ratio is calculated according to <Equation 3>, but although the similarity is calculated and the penalty value is calculated in different methods, the effect according to the present disclosure may be acquired. For example, instead of the similarity depending on the SAD, a 'cross correlation' value may be used in <Equation 4> above and $rd_{i,u,v}$ in <Equation 3> above may be also acquired by calculating the distance ratios $r_i$ and $r_{i,u,v}$ with the adjacent control points in different methods.

The color block matching unit 422 reduces the drift phenomenon in which the control point is drifted along the texture of the background area by decreasing the weight of the color information of the background area while including the boundary between the foreground and the background using the color mask template $TP_{CM,i,k}$ of <Equation 2> according to the exemplary embodiment of the present disclosure. The color block matching unit 422 calculates the penalty coefficient $K_{EDP,i,u,v}$ depending on the variation of the distance ratio with the adjacent control points by <Equation 3> above, and uses the penalty coefficient, $K_{EDP,i,u,v}$ to calculate the similarity $Sim_{i,u,v}$ of <Equation 4>.

The color and edge block weight calculating unit 423 which is a subsequent processing unit of the color block matching unit 422 in the minute adjustment unit 420 determines a weight coefficient between the similarity in the color image and the similarity in the edge image for the i-th control point, which is calculated according to the previously calculated maximum similarity $Sim_{i,color}^{max}$ in the color image. In this case, $Sim_{i,color}^{max}$ is a color similarity value at a position $(u', v')_{i,color}$ in the color block matching unit.

In <Equation 5> below, $\alpha_i$ denotes a weight for edge block similarity and $\beta_i$ is a weight for color block similarity, and the values are used in subsequent steps. $th_{min}$ and $th_{max}$ are thresholding values which are experimentally determined.

<Equation 5> is an exemplary embodiment of calculating $\alpha_i$ and $\beta_i$, and although $\alpha_i$ and $\beta_i$ are calculated by using different methods in a range of satisfying a condition of satisfying a condition in which $\alpha_i$ is inversely proportional and $\beta_i$ is proportional within a predetermined range with respect to $Sim_{i,color}^{max}$, the same effect of the disclosure may be acquired.

$$\text{if } Sim_{i,color}^{max} < th_{min} \text{ then } \alpha_i = \alpha_{max} \qquad \text{[Equation 5]}$$
$$\text{else if } Sim_{i,color}^{max} > th_{max} \text{ then } \alpha_i = 0$$
$$\text{else } \alpha_i = \left(\frac{\alpha_{max}}{th_{max} - th_{min}}\right) * (th_{max} - Sim_{i,color}^{max})$$
$$\beta_i = 1.0 - \alpha_i$$

The edge block matching and final matching result calculating unit 424 which is a final processing unit of the minute adjustment unit 420 acquires the edge image by using a Sobel edge operator and finds the most similar position through block matching between the prior and post frame images with respect to the i-th control point. First, the edge block matching and final matching result calculating unit 424 converts the color image of the current frame into a gray image and acquires an edge image illustrated in FIG. 7B by using the edge operator such as the Sobel operator. The edge block matching and final matching result calculating unit 424 calculates edge similarity according to <Equation 6> below at the position moved by (u, v) from $(x_i', y_i')$ acquired from the plane tracking processing unit 410 with respect to the i-th control point.

$$ESim_i(u, v) = \frac{1}{N_{TP}} \sum_{k=0}^{N_{TP}} CC(Mul(TP_{EM,i,k}, B_{E,t}(x_i'+u, y_i'+v)), TP_{E,i,k}) \qquad \text{[Equation 6]}$$

In <Equation 6> above, CC(A,B) denotes a cross correlation function between matrices A and B, Mul(A,B) means a multiplying operation between elements of the matrices A and B, $B_{E,t}(x_i'+u, y_i'+v)$ denotes an M*N block extracted around $(x_i'+u, y_i'+v)$ in the edge image of the current frame. Final similarity $FinalSim_i(u, v)$ in which edge similarity and color similarity are fused is calculated according to <Equation 7> below. In <Equation 7> below, $CSim_{i,u,v}$ is the same value as the color similarity $Sim_{i,u,v}$ at the position $(x_i'+u, y_i'+v)$ calculated in <Equation 4> above and a prefix C is attached in order to discriminate $CSim_{i,u,v}$ from the edge similarity, $ESim^i(u,v)$. Finally, $(u',v')_{i,final}$ in which is FinalSim$_i$(u, v) is the maximum is found to be stored as the result of the minute adjustment unit 420 which will complement the result of the plane tracking processing unit 410 with respect to the i-th control point.

$$FinalSim_i(u, v) = \alpha_i * K_{EDP,i,u,v} * ESim_i(u, v) + CSim_{i,u,v} \qquad \text{[Equation 7]}$$
$$(u', v')_{i,final} = \underset{(u,v)}{\mathrm{argmax}}(FinalSim_{i,u,v})$$

Referring back to FIG. 1, the postprocessing unit 140 applies Gaussian-smoothing on the time axis to the difference $(u', v')_{i,final}$ between the result of the plane tracking processing unit 410 and the result of the minute adjustment unit 420 to reduce the flickering.

In this step, only flickering which the respective control points individually have may be removed while an overall minute motion of the object constituting the layer is conserved according to the exemplary embodiment of the present disclosure, by not smoothing each control point coordinate itself but by smoothing only the difference $(u', v')_{i,final}$ between the result of the plane tracking processing unit 410 and the result of the minute adjustment unit 420 to reduce the flickering.

Lastly, the alpha map generating unit 150 of FIG. 1 connects the respective control point coordinates by the aforementioned curve generation scheme in all the frames and determines the internal area as the layer area to generate and store the alpha map illustrated in FIG. 3A. As described above, when the initial area designating unit 120 divides an independent object into a plurality of layers for each part and performs tracking for each layers in the subsequent steps in order to increase the accuracy of the layer extraction result, the alpha map generating unit 150 fuse the layers of respective parts through an OR operation. For example, one person object is divided into a head, a arm, a body and legs and each part is tracked respectively and the layers for each part are fused in the alpha map generating unit to acquire a final layer of a person object.

Figure 9:
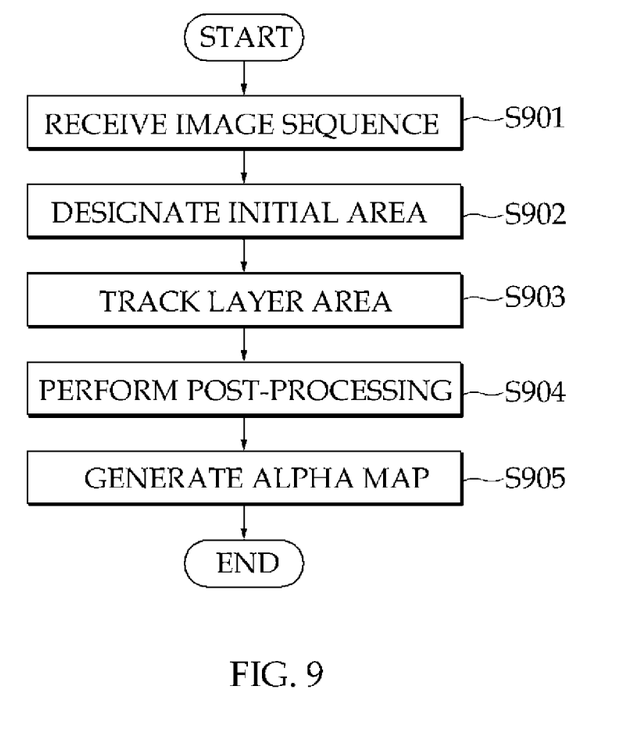
FIG. 9 is a flowchart illustrating a procedure of extracting a foreground layer from an image sequence according to the exemplary embodiment of the present disclosure.

FIG. 9 is a flowchart illustrating a procedure of extracting foreground layer from an image sequence according to an exemplary embodiment of the present disclosure. Referring to FIG. 9, the original image sequence photographed by the camera is first received (S901) according to the exemplary embodiment of the present disclosure as described above, the control points are designated on the image for each frame on the contour of the layer to be extracted by user's manipulation through an input device to designate the initial area at the first frame (S902).

Next, the designated control points are connected to generate a foreground layer area. In tracking the layer area (S903), a homography matrix is calculated for each frame on the assumption that the layer area to be tracked is a plane. Coordinates of the respective control points in the current frame are calculated according to the calculated homography matrix. Thereafter, as described above, a more delicate coordinate with respect to the respective control points in the current frame is calculated through block matching in the minute adjustment unit.

Next, post processing is performed through the postprocessing unit (S904) to reduce the flickering phenomenon by Gaussian-smoothing on the time axis for the difference between the result of the plane tracking processing unit and the result of a minute adjustment unit for each control point.

Lastly, the alpha map generating unit connects the respective control point coordinates by the curve generation scheme in all the frames and determines the internal area as the layer area to generate and store the alpha map through the alpha map generating unit.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for extracting a foreground layer from an image sequence, comprising:
    an image sequence receiving unit configured to receive an original image sequence photographed by a camera;
    an initial area designating unit configured to designate a plurality of control points on a contour of a layer area in image data for each frame based on a selection input through an input device;
    a layer area tracking unit configured to generate a foreground layer area by connecting the designated control points and track the generated foreground layer for each frame; and
    an alpha map generating unit configured to connect respective control point coordinates by a curve generation scheme in all frames in which the layer area is tracked and generate an alpha map by determining an internal area as the layer area.

2. The apparatus of claim 1, further comprising:
    a postprocessing unit configured to Gaussian-smooth a difference from a plane tracking processing unit for the respective control points calculated from the layer area tracking unit on a time axis.

3. The apparatus of claim 1, wherein the layer area tracking unit includes a plane tracking processing unit configured to calculate a homography matrix representing a 2D projective transform relationship on the assumption that a layer area to be tracked is a plane.

4. The apparatus of claim 3, wherein the plane tracking processing unit includes:
    a plane tracking area defining unit configured to generate an area of which a range of several pixels is extended to include a boundary portion between the layer area and the background by applying morphology dilatation to the layer area designated by the initial area designating unit, and to defined the area as a plane tracking area;
    Loucas Kanade Tomasi(LKT) based plane movement calculating unit configured to calculate the homography matrix by optimizing a corresponding relationship of features detected between prior and post frames within the tracking area; and
    Levenderg-Marquardt(LM) based optimizing unit configured to optimize the homography matrix acquired by the LKT based plane movement calculating unit with respect to color information of all pixels in the tracking areaand calculate a control point coordinate in the current frame by applying the homography matrix to the respective control points.

5. The apparatus of claim 1, wherein the layer area tracking unit includes a minute adjustment unit configured to calculate a more delicate coordinate in the current frame through block matching with respect to each control point.

6. The apparatus of claim 5, wherein the minute adjustment unit includes:
    a template set updating unit configured to store template sets of the corresponding control point from the previous frame and when the number of the template sets of the corresponding control point is more than a predetermined number, remove the oldest template set in sequence;
    a color block matching unit configured to retrieve the position of the current frame most similar to the block of the template with respect to the corresponding control point;
    a color and edge block weight calculating unit configured to determine a weight coefficient between similarity in a color image and similarity in an edge image with respect to the corresponding control point; and
    an edge block matching and final matching result calculating unit configured to calculate the edge image by using a Sobel edge operator and retrieve the most similar position through block matching in prior and post frame images with respect to the corresponding control point.

7. A method of extracting a foreground layer from an image sequence, comprising:
    receiving, by an image sequence receiving unit, an original image sequence photographed by a camera;
    designating, by an initial area designating unit, a plurality of control points on a contour of a layer area in image data for each frame based on a selection input through an input device;
    generating, by a layer area tracking unit, a foreground layer area by connecting the designated control points;
    tracking, by the layer area tracking unit, the generated foreground layer for each frame;
    connecting, by an alpha map generating unit, respective control point coordinates by a curve generation scheme in all frames in which the layer area is tracked; and
    generating, by the alpha map generating unit, an alpha map by determining the connected internal area as the layer area.

8. The method of claim 7, further comprising:
    after the tracking of the layer area,
    Gaussian-smoothing, by a postprocessing unit, a difference from a plane tracking processing unit for the respective calculated control points on a time axis.

9. The method of claim 7, wherein the tracking of the layer area includes calculating a homography matrix representing a 2D projective transform relationship on the assumption that a layer area to be tracked is a plane.

10. The method of claim 9, wherein the calculating of the homography matrix includes:

generating an area of which a range of several pixels is extended to include a boundary portion between the layer area and the background by applying morphology dilatation to the layer area designated by the initial area designating unit and defining the generated area as a plane tracking area;

calculating the homography matrix by optimizing a corresponding relationship of features detected between prior and post frames within the tracking area; and optimizing the acquired homography matrix with respect to color information of all pixels within a tracking area and calculating a control point coordinate in the current frame by applying the homography matrix to the respective control points.

11. The method of claim 7, wherein the tracking of the layer area includes minute adjustment of calculating a more delicate coordinate in the current frame through block matching with respect to each control point.

12. The method of claim 11, wherein the minute adjustment includes:

storing template sets of the corresponding control point from the previous frame and when the number of the template sets of the corresponding control point is more than a predetermined number, removing the oldest template set in sequence;

retrieving the position of the current frame most similar to the block of the template with respect to the corresponding control point;

determining a weight coefficient between similarity in a color image and similarity in an edge image with respect to the corresponding control point; and calculating the edge image by using an edge operator and retrieving the most similar position through block matching in prior and post frame images with respect to the corresponding control point.

* * * * *